(12) United States Patent
Helman et al.

(10) Patent No.: US 8,347,059 B2
(45) Date of Patent: Jan. 1, 2013

(54) MANAGEMENT OF RECYCLING BIN FOR THINLY-PROVISIONED LOGICAL VOLUMES

(75) Inventors: Haim Helman, Herzliya (IL); Shemer Schwarz, Tel-Aviv (IL); Kariel Eliahu Sandler, Bat Hefer (IL)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 12/192,242

(22) Filed: Aug. 15, 2008

(65) Prior Publication Data
US 2010/0042802 A1   Feb. 18, 2010

(51) Int. Cl.
*G06F 13/00* (2006.01)
*G06F 12/00* (2006.01)
*G06F 13/28* (2006.01)

(52) U.S. Cl. ........ 711/170; 711/173; 711/202; 711/203; 711/206; 711/E12.01

(58) Field of Classification Search .................. 711/170, 711/173, 202, 203, 206, E12.01
See application file for complete search history.

(56) References Cited

U.S. PATENT DOCUMENTS

| 6,366,988 | B1 | 4/2002 | Skiba et al. | |
| 7,293,145 | B1 | 11/2007 | Baird et al. | |
| 2003/0065780 | A1* | 4/2003 | Maurer et al. | 709/225 |
| 2005/0091455 | A1* | 4/2005 | Kano et al. | 711/114 |
| 2006/0101200 | A1* | 5/2006 | Doi | 711/113 |
| 2006/0149901 | A1 | 7/2006 | Sasage et al. | |
| 2006/0253670 | A1 | 11/2006 | Zohar et al. | |
| 2006/0253681 | A1 | 11/2006 | Zohar et al. | |
| 2007/0143546 | A1* | 6/2007 | Narad | 711/130 |
| 2008/0313407 | A1* | 12/2008 | Hu et al. | 711/133 |
| 2010/0023777 | A1* | 1/2010 | Prevost et al. | 713/180 |

FOREIGN PATENT DOCUMENTS

| EP | 0668555 | 8/1995 |
| WO | WO-2008061892 | 5/2008 |

* cited by examiner

*Primary Examiner* — Midys Rojas
(74) *Attorney, Agent, or Firm* — Griffiths & Seaton PLLC

(57) ABSTRACT

A method for data storage includes representing logical volumes by respective sets of pointers to physical partitions in which data used by the logical volumes is stored. One or more of the logical volumes are defined as provisionally deleted. A subset of the provisionally-deleted logical volumes is selected such that each logical volume in the subset has one or more private physical partitions whose data is used exclusively by that logical volume. One or more of the private physical partitions of the logical volumes in the subset are released for reallocation to another logical volume.

25 Claims, 3 Drawing Sheets

US 8,347,059 B2

MANAGEMENT OF RECYCLING BIN FOR THINLY-PROVISIONED LOGICAL VOLUMES

FIELD OF THE INVENTION

The present invention relates generally to data storage, and particularly to methods and systems for managing logical volumes in data storage systems.

BACKGROUND

Data storage systems typically store data on physical media in a manner that is transparent to host computers. From the perspective of a host computer, data is stored on virtual storage devices that are commonly known as logical volumes. Logical volumes are typically configured to store the data required for a specific data processing application. Data storage systems map logical volumes to addressable physical locations on storage media, such as direct-access hard disks.

System administrators frequently make copies of logical volumes, for example in order to perform backups or to test and validate new applications. Such copies are commonly referred to as snapshots.

BRIEF SUMMARY

An embodiment of the present invention provides a method for data storage. The method includes representing logical volumes by respective sets of pointers to physical partitions in which data used by the logical volumes is stored. One or more of the logical volumes are defined as provisionally deleted. A subset of the provisionally-deleted logical volumes is selected such that each logical volume in the subset has one or more private physical partitions whose data is used exclusively by that logical volume. One or more of the private physical partitions of the logical volumes in the subset are released for reallocation to another logical volume. Apparatus, system and computer software product for data storage are also provided.

In some embodiments, at least one of the logical volumes in the subset includes a copy of a given logical volume. In an embodiment, releasing the private physical partitions includes permanently deleting the logical volumes in the subset. In another embodiment, representing the logical volumes includes defining a reference-count list indicating respective counts of the logical volumes that point to the physical partitions, and permanently deleting the logical volumes in the subset includes updating the reference-count list.

In yet another embodiment, selecting the subset includes selecting the provisionally-deleted logical volumes having oldest provisional deletion times. Alternatively, selecting the subset may include selecting the provisionally-deleted logical volumes having highest numbers of the private physical partitions.

In some embodiments, representing the logical volumes includes representing the logical volumes by a hierarchical tree structure including nodes, wherein each of the nodes includes a respective set of local pointers, and wherein the logical volumes are represented by respective nodes such that the local pointers in the nodes located along a path via the tree structure that connects a given node to a root node of the tree structure point to the physical partitions in which the data used by the logical volume represented by the given node is stored. In a disclosed embodiment, the local pointers in each node point to the private physical partitions of that node, and selecting the subset includes identifying the nodes having non-empty sets of the local pointers as representing the logical volumes having the private partitions.

In another embodiment, releasing the private physical partitions includes permanently deleting the logical volumes in the subset by deleting the nodes representing the logical volumes in the subset from the tree structure.

In yet another embodiment, the tree structure includes a binary tree in which the logical volumes are represented by leaf nodes and in which nodes that connect the leaf nodes to the root node include artificial nodes, and deleting a first leaf node, which represents a first logical volume and is located below an artificial node, includes:

deleting from the tree structure a second leaf node that represents a second logical volume and is located below the artificial node;

converting the artificial node into a merged node representing the second logical volume; and combining the local pointers of the second leaf node with the local pointers of the artificial node to produce the local pointers of the merged node.

In some embodiments, the method includes accepting a request to allocate at least one physical partition to the other logical volume, and selecting the subset and releasing the private physical partitions responsively to the request. The request may include an instruction to create the other logical volume. Alternatively, the request may include an instruction to resize the other logical volume. In an embodiment, the data used by the other logical volume is stored on a first storage device, and the request includes an instruction to allocate the at least one physical partition to the other logical volume on a second storage device upon a failure in the first storage device.

BRIEF DESCRIPTION OF THE SEVERAL VIEWS OF THE DRAWINGS

The present invention will be more fully understood from the following detailed description of the embodiments thereof, taken together with the drawings in which:

BRIEF DESCRIPTION OF THE SEVERAL VIEWS OF THE DRAWINGS

Figure 1:
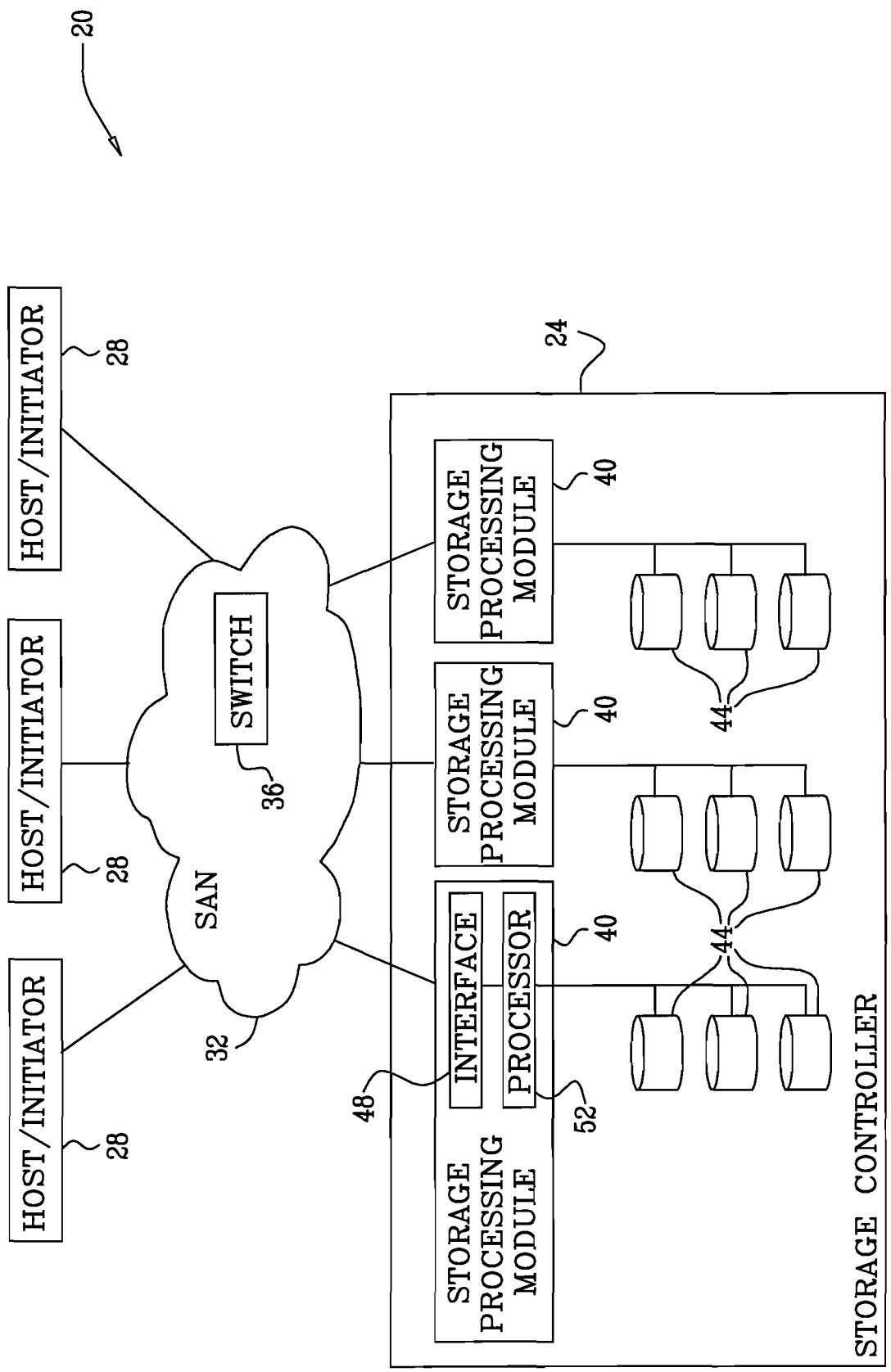
Figure 2:
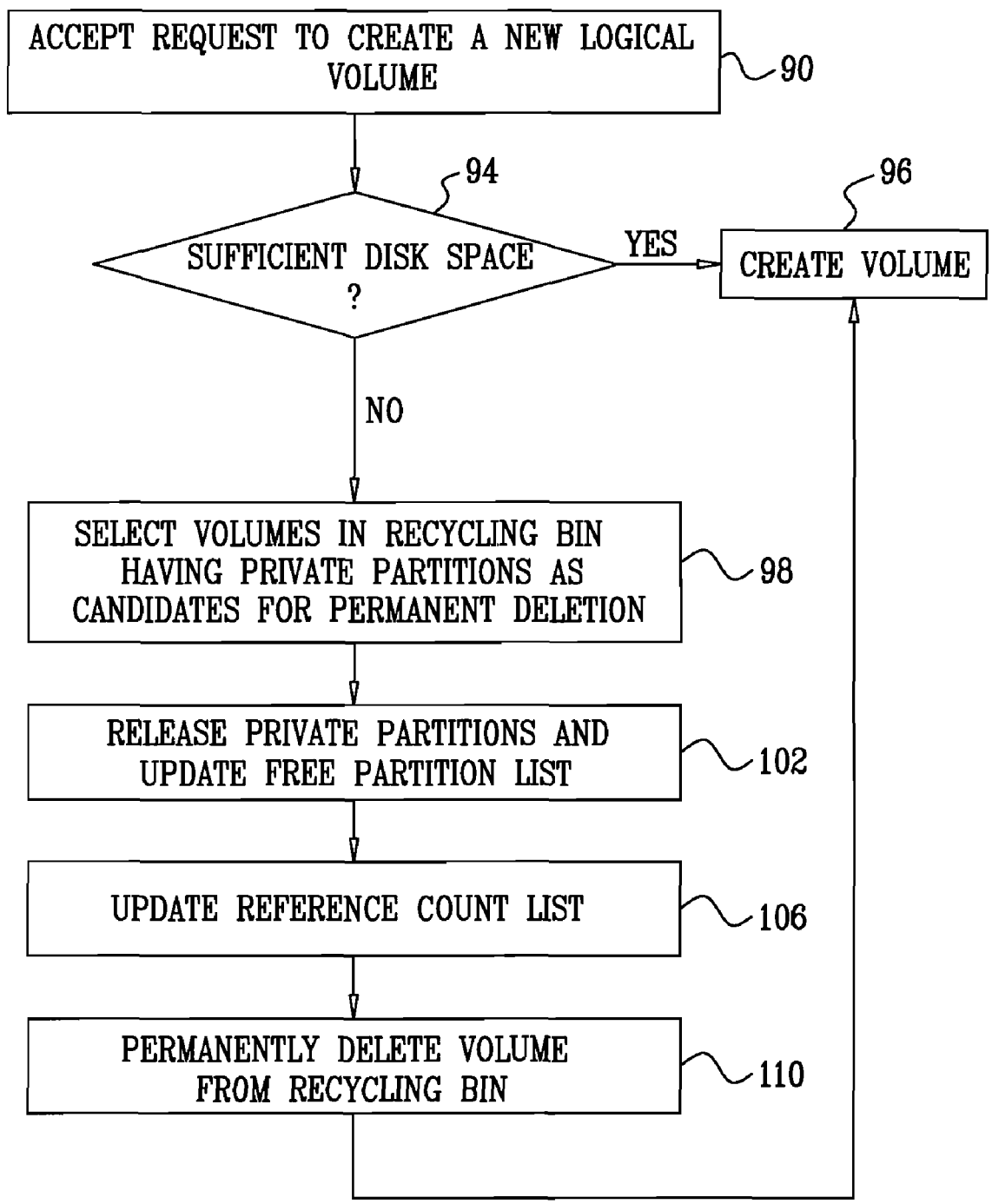
Figure 3:
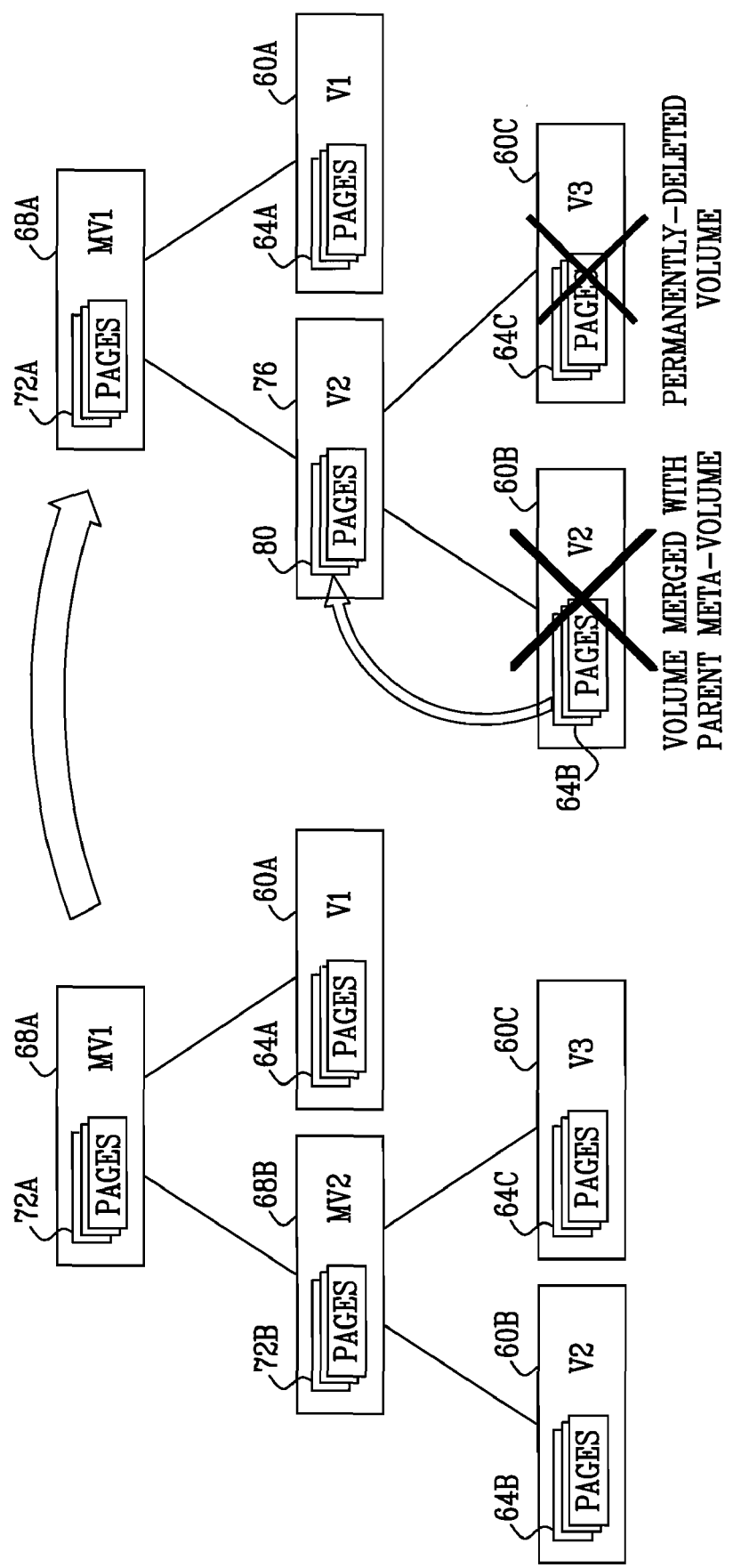

FIG. 1 is a block diagram that schematically illustrates a data storage system, in accordance with an embodiment of the present invention;

FIG. 2 is a flow chart that schematically illustrates a method for freeing disk partitions in a data storage system, in accordance with an embodiment of the present invention; and FIG. 3 is a diagram that schematically illustrates a process for deleting logical volumes represented by a hierarchical data structure, in accordance with an embodiment of the present invention.

DETAILED DESCRIPTION

Overview

Embodiments of the present invention that are described hereinbelow provide methods and systems for managing a "recycling bin" for logical volumes. In some embodiments, a storage controller stores data in logical volumes. Each logical volume is represented by a respective list of pointers to physical partitions in a storage device, which hold the data used by the volume. When a user (e.g., an administrator) deletes a given logical volume, the storage controller defines the volume as provisionally-deleted, and retains the physical partitions of the deleted volume and the corresponding pointers. The deleted volume is moved from a list of valid volumes to a list of provisionally-deleted volumes (a "recycling bin"). As long as the physical partitions of the provisionally-deleted volume are retained, the user may reclaim the volume, i.e., request the storage controller to return the volume to the list of valid volumes.

In some embodiments, the storage controller represents the logical volumes using a thinly-provisioned configuration, in which a given physical partition may be used (pointed to) by multiple logical volumes. The scenario of having multiple logical volumes that use the same physical partition is common, for example, when the volumes comprise copies ("snapshots") of a certain logical volume taken at successive time intervals. Thinly-provisioned configurations are highly efficient in using storage space, since data that is used by multiple logical volumes need not be duplicated in separate physical partitions.

When storage space is limited, the storage controller typically selects one or more of the provisionally-deleted volumes, and deletes them permanently in order to free physical partitions. When using thinly-provisioned volumes, however, the task of permanently deleting volumes is complicated, because some of the physical partitions that are used by a deleted volume may also be used by other volumes. Thus, unconditionally releasing the physical partitions of a provisionally-deleted volume may damage other volumes.

The methods and systems described herein solve the above-mentioned difficulties by selecting as candidates for permanent deletion provisionally-deleted logical volumes having private physical partitions. A private physical partition of a logical volume is defined as a physical partition whose data is used exclusively by that logical volume, and not by any other logical volume. As such, a private physical partition can be safely released for reallocation without risk of affecting volumes other than the single volume that uses this physical partition.

In some embodiments, the storage controller accepts a request to allocate one or more physical partitions to a given logical volume. In response to the request, the storage controller selects a subset of the provisionally-deleted logical volumes, such that each logical volume in the subset has at least one private physical partition. The storage controller may select the subset of provisionally-deleted volumes using various criteria. Several example criteria are described herein.

The storage controller permanently deletes the selected logical volumes in the subset, and releases one or more of the private physical partitions of these volumes. The released physical partitions are then reallocated to the given logical volume. Using this technique, only physical partitions that are used exclusively by the permanently-deleted volumes are released, and other volumes are not affected.

In some embodiments, the methods and systems described herein are applied to logical volumes that are copies of other logical volumes. Such copies are also known as snapshots. These snapshots are represented using a thinly-provisioned representation, and are stored and managed by the storage controller in the manner described above.

In some embodiments, the storage controller represents the logical volumes using a hierarchical data structure. Techniques for identifying private physical partitions and for deleting logical volumes using the hierarchical data structure are described herein.

System Description

FIG. 1 is a block diagram that schematically illustrates a data storage system 20, in accordance with an embodiment of the present invention. System 20 comprises a storage controller 24, which stores and retrieves data for hosts 28. The hosts are also referred to as initiators.

In the configuration of FIG. 1, the hosts are connected to the storage controller via a Storage Area Network (SAN) 32, as is known in the art. The SAN typically comprises one or more network switches 36. The hosts and storage controller may communicate over SAN 32 using any suitable protocol, such as the Small Computer System Interface (SCSI) and/or Fibre-Channel (FC) protocols. Although the embodiment of FIG. 1 refers to a SAN configuration, the hosts and storage controller may be connected using any other suitable configuration, such as a Network-Attached Storage (NAS) or Direct-Attached Storage (DAS) configuration.

Storage controller 24 comprises multiple storage processing modules 40, which store data in multiple storage devices, such as disks 44. Storage controller 24 may comprise any desired number of modules 40 and any desired number of disks 44. In a typical configuration, the storage controller may comprise between 1-32 storage processing modules and between 2-2000 disks, although any other suitable numbers can also be used. In the exemplary configuration of FIG. 1, each module 40 stores data in a separate set of disks 44. In alternative embodiments, however, a given disk 44 need not be uniquely associated with a particular module 40. For example, a pool of disks 44 may be common to all modules 40.

Each storage processing module 40 comprises a network interface 48 for communicating with hosts 28 over SAN 32, and a processor 52, which carries out the various storage and retrieval tasks of the module. In particular, processor 52 manipulates a "recycling bin" that allows logical volumes and copies of logical volumes to be provisionally-deleted and later reclaimed, using methods that are described in detail below.

Logical Volumes and Snapshots

Storage controller 24 stores data on disks 44 by allocating logical volumes to hosts 28, or to specific applications running on the hosts. Each logical volume is typically identified by a unique Logical Unit Number (LUN). From the perspective of the host, an application issues Input/Output commands (e.g., read and write commands) to a logical volume, without knowledge of the physical storage locations in disks 44 in which the data is actually stored.

In some embodiments, processor 52 represents each volume by a list of pointers to physical partitions on disks 44, which store the data used by the volume. Such a representation is referred to as a "thinly-provisioned" representation. When using thinly-provisioned volumes, a given physical partition may be pointed to by multiple volumes, if these volumes use the same data. In many cases, large amounts of data are common to multiple logical volumes. In these cases, the thinly-provisioned representation is highly efficient in using disk memory space.

(A physical partition is sometimes referred to herein as a page. The terms "physical storage location," "physical page," "physical partition," "storage location," "page" and "partition" are used interchangeably herein and refer to any form of physical storage location defined in disks 44.)

In various scenarios, a user (e.g., a system administrator) creates copies of logical volumes. Copies of logical volumes are often referred to as snapshots, and the two terms are used interchangeably herein. Copies may be used, for example, for backing-up the logical volume or for performing certain low-priority processing tasks, such as collection of statistics.

Once created, a snapshot may be accessed and modified by hosts similarly to a logical volume. In some embodiments, each snapshot is assigned a corresponding LUN and the hosts are aware of these LUNs. Typically, processor 52 holds a mapping table that maps LUNs of logical volumes and snapshots to physical partitions on disks 44. Similarly to logical volumes, processor 52 of storage controller 24 represents snapshots using a thinly-provisioned representation. When using thinly-provisioned snapshots, creation of a new snapshot does not involve physical writing of data on disks 44. Data is written physically only when it is modified.

In some embodiments, processor 52 further maintains a reference-count list, which indicates the number of thinly-provisioned logical volumes and snapshots that use (point to) each physical partition. For example, consider a logical volume denoted V1, for which an administrator has created two snapshots denoted S1 and S2. At a certain point in time, volume V1 uses physical partitions {0,1,2,3,4,5}, snapshot S1 uses physical partitions {0,1,2,3,104,5} and snapshot S2 uses physical partitions {0,1,2,3,104,105}. The following reference-count list corresponds to this scenario:

| Physical partition | Number of logical volumes and snapshots using the partition |
|---|---|
| 0 | 3 |
| 1 | 3 |
| 2 | 3 |
| 3 | 3 |
| 4 | 1 |
| 5 | 2 |
| 104 | 2 |
| 105 | 1 |

Provisional and Permanent Deletion of Logical Volumes and Snapshots

As part of operating storage controller 24, users (e.g., administrators or users of hosts 28) may create, delete, resize or otherwise manipulate logical volumes and snapshots. In some embodiments, storage controller 24 supports a mechanism that allows logical volumes and snapshots to be defined as "provisionally deleted." (The description that follows refers to logical volumes for the sake of clarity, but the methods and systems described herein are equally applicable to snapshots.)

When a user deletes a certain logical volume, processor 52 does not release the physical partitions used by this volume and does not modify the reference-count list, but rather defines the volume as provisionally deleted. Space-permitting, processor 52 retains the physical partitions used by the provisionally-deleted volume, as well as the pointers to these physical partitions, and does not allocate the physical partitions to other volumes. In some embodiments, the provisionally-deleted volume is moved from a list of valid volumes into a list ("recycling bin") of provisionally-deleted volumes. The user may reclaim the provisionally-deleted volume from the recycling bin and request that processor 52 return the volume to the list of valid volumes, such as when the volume was deleted accidentally. Thus, a volume that is deleted by a user is marked as invisible to the user, but is retained and may be recovered later if desired.

In some embodiments, each volume is assigned an internal name, which is recognized internally to the storage controller, and an external name (e.g., LUN) that is visible to the hosts.

Processor 52 may maintain a mapping table that maps the internal names to the external names. When using such a table, the external name of a provisionally-deleted volume can be freed and assigned to a new volume, while the internal name of the volume remains associated with the physical partitions of the provisionally-deleted volume. Additionally or alternatively, the volumes can be renumbered when provisionally deleting a volume.

A given provisionally-deleted logical volume may be deleted permanently by processor 52. Subject to certain restrictions that are described further below, physical partitions of a permanently-deleted volume may be released for use and may be reallocated to new volumes or for any other purpose. Thus, a permanently-deleted volume cannot be recovered by the user and its data is lost.

In some embodiments, processor 52 may delete a given volume permanently when disks 44 do not have a sufficient number of free physical partitions for allocating to new volumes. For example, assume a scenario in which processor 52 is requested to create a new logical volume (or increase the size of an existing volume), but does not have a sufficient number of physical partitions in disks 44 in order to do so. In such a case, the processor may select one or more provisionally-deleted volumes, delete them permanently and reallocate their physical partitions to the volume being created or resized.

When using thinly-provisioned volumes, however, the task of permanently deleting a volume becomes complicated, since a given physical partition may be used by multiple volumes. Simply releasing the physical partitions of a given provisionally-deleted volume may damage other volumes (which may be valid of provisionally deleted) that share some of the physical partitions of the deleted volume.

In view of the difficulties described above, embodiments of the present invention provide methods and systems for managing thinly-provisioned logical volumes and snapshots. The methods and systems described herein enable both provisional and permanent deletion of thinly-provisioned volumes and snapshots, such as for releasing physical partitions for reallocation to new volumes.

In some embodiments, processor 52 frees memory space in disks 44 by identifying provisionally-deleted volumes, which have private physical partitions. The term "private physical partition" refers to a physical partition that is used by only a single logical volume. As can be appreciated, a private physical partition of a provisionally-deleted volume can be released without risk of damaging other volumes. The logical volume that uses this physical partition is deleted permanently, but this deletion does not affect other (valid or provisionally-deleted) volumes.

FIG. 2 is a flow chart that schematically illustrates a method for freeing disk partitions for creating a thinly-provisioned logical volume, in accordance with an embodiment of the present invention. The method begins with processor 52 accepting a request to create a new logical volume, at a request accepting step 90. The request typically comprises a requested size of the volume.

Processor 52 checks whether sufficient free disk space is available in disks 44 for creating the new volume, at a free space checking step 94. If sufficient disk space is available, processor 52 creates the requested volume, at a volume creation step 96, and the method terminates.

Otherwise, processor 52 attempts to free physical partitions that are used by provisionally-deleted volumes, in order to reallocate these physical partitions to the new volume. Processor 52 identifies provisionally-deleted volumes having at least one private physical partition, at a candidate identification step 98. As explained above, a provisionally-deleted volume having private physical partitions is likely to be a good candidate for permanent deletion, because releasing the private physical partitions does not affect other volumes.

Processor 52 may use various techniques for identifying provisionally-deleted volumes having private physical partitions. For example, when the processor maintains a reference-count list indicating the number of logical volumes that use each physical partition, the processor can identify physical partitions whose reference count is "1" as private physical partitions. In some embodiments, processor 52 represents the logical volumes using a hierarchical tree data structure, in which private physical partitions can be identified in a straightforward manner. These embodiments are described in detail further below.

In some embodiments, processor 52 selects a subset of the provisionally-deleted volumes having private physical partitions, in accordance with certain predefined criteria. The criteria may depend on the properties of the identified candidate volumes and/or on the requested size of the new volume. For example, processor 52 may choose the oldest provisionally-deleted volumes (e.g., the logical volumes having the oldest provisional deletion time), assuming that permanent deletion of such volumes will have minimal impact on the system. Additionally or alternatively, the processor may choose the provisionally-deleted volumes having the highest numbers of private physical partitions, so that a relatively small number of volumes will need to be permanently deleted in order to release the requested number of physical partitions. Further additionally or alternatively, processor 52 may apply any other suitable criteria for selecting a subset of the provisionally-deleted volumes having private physical partitions as candidates for permanent deletion.

In some embodiments, processor 52 first verifies that it is possible to release the requested number of physical partitions. If, for example, processor 52 determines that the entire list of provisionally-deleted volumes does not contain a sufficient number of private physical partitions, the processor may deny the request and return an error ("disk full") message.

At this stage, processor 52 has selected a subset of one or more provisionally-deleted logical volumes, each of which has at least one private physical partition that is not used by any other volume. These provisionally-deleted volumes are to be deleted permanently, and their private physical partitions released and reallocated to the new volume.

Processor 52 releases the private physical partitions of the provisionally-deleted volumes in the subset, at a releasing step 102. Note that although the logical volumes in the selected subset will be permanently deleted, the processor does not release all of the physical partitions used by these volumes, but only the private physical partitions. As explained above, releasing non-private physical partitions may damage other volumes.

Processor 52 updates the reference-count list, at a reference count updating step 106. The reference-count list is updated to indicate the updated number of volumes that use each physical partition, after permanent deletion of the provisionally-deleted volumes selected at step 98 above. For each volume that is permanently deleted, processor 52 decrements the reference count of each physical partition used by the volume. For private physical partitions (i.e., physical partitions whose reference count was "1" before updating the list), processor 52 removes these physical partitions from the reference-count list and moves them to the list of free physical partitions. The released physical partitions are now free and can be allocated to the new volume. Processor 52 permanently deletes the provisionally-deleted volumes in the subset (the volumes selected at step 98 above), at a permanent deletion step 110.

At this stage, processor 52 has released a sufficient number of physical partitions for allocating to the new volume. The method thus moves to volume creation step 96 above, in which processor 52 creates the new volume using the released physical partitions.

Although the method of FIG. 2 refers to creation of a new logical volume, the method can also be used for allocating additional physical partitions to an existing volume, or for any other suitable task that involves allocating physical partitions to a volume. For example, when a certain physical disk fails, physical partitions that were originally stored on this disk may be reallocated to other disks. In such a scenario, the methods and systems described herein can be used for freeing disk space on another disk for storage of the reallocated partitions.

Moreover, in some cases disks 44 may have some free physical partitions, but less than the requested number. In such cases, processor 52 may allocate some physical partitions out of the free physical partitions, and release additional physical partitions using the method of FIG. 2. As noted above, the method of FIG. 2 is equally applicable to logical volumes and to snapshots.

Permanent Deletion of Thinly-Provisioned Logical Volumes Using a Hierarchical Data Structure In some embodiments, processor 52 represents a set of thinly-provisioned logical volumes and/or snapshots using a hierarchical data structure, i.e., a tree structure. (Again, the description that follows addresses logical volumes for the sake of clarity, but the disclosed data structures and techniques are equally applicable to snapshots.)

The logical volumes are represented by nodes of the tree. Each node has a set of pointers to a (possibly empty) set of pages (physical partitions). The pointers specified in a given node are referred to as the local pointers or local physical partitions of the node. The volumes populate the tree so that each volume uses its local physical partitions, and the physical partitions of its parents. In other words, each volume uses its own local physical partitions, and the physical partitions that are pointed to by the nodes along the path that connect it to the root. This tree representation is efficient, since it exploits the inherent commonality in physical partitions among different volumes. Physical partitions that are used by multiple volumes are located at high levels of the tree, instead of duplicating them in multiple individual snapshots.

In some embodiments, the tree comprises a binary tree, i.e., each node is either a leaf having no lower-level nodes or has exactly two lower-level nodes. In these embodiments, the volumes populate only the leaves of the tree. Higher-level nodes comprise virtual nodes that are referred to as meta-volumes (MV) or artificial nodes. The meta-volumes are not associated with volumes. Each node, including the leaves (representing the volumes) and the meta-volumes, has a corresponding (possibly empty) set of local pointers to physical partitions on disks 44.

The use of the tree structure for performing deletion operations on logical volumes and snapshots is demonstrated in FIG. 3 below. Further aspects of using hierarchical data structures for representing logical volumes and snapshots are addressed, for example, in U.S. Patent Application Publications 2006/0253670 and 2006/0253681.

FIG. 3 is a diagram that schematically illustrates a process for deleting logical volumes represented by a hierarchical data structure, in accordance with an embodiment of the present invention. The left hand side of FIG. 3 shows a binary tree representation of three logical volumes denoted V1 . . . V3, which are represented by tree nodes 60A . . . 60C, respectively. Volumes V1 . . . V3 have respective sets of local pointers 64A . . . 64C. Each set of local pointers point to physical partitions in disks 44 that are used by the respective volume. The binary tree structure further comprises two meta-volume nodes 68A and 68B, denoted MV1 and MV2, respectively. Meta-volume nodes 68A and 68B have local pointers 72A and 72B, respectively.

The tree structure is constructed such that each volume (node) uses the physical partitions that are pointed to by the local pointers of the node itself and by its parent nodes. For example, volume V1 uses the physical partitions pointed to by pointers 64A of node 60A and the physical partitions pointed to by pointers 72A of meta-volume node 68A. Similarly, volume V2 uses the physical partitions pointed to by pointers 64B of node 60B, the physical partitions pointed to by pointers 72B of meta-volume node 68B and the physical partitions pointed to by pointers 72A of meta-volume node 68A.

Typically, the local pointers of a given node point to the private physical partitions of the node, i.e., to the physical partitions that are used exclusively by the node. Non-private physical partitions would typically populate higher-level nodes in the tree. Thus, processor 52 can query the local pointers of the different tree nodes so as to identify volumes having private physical partitions (e.g., in order to select candidate volumes for permanent deletion when freeing disk space—see step 98 of the method of FIG. 2 above). For example, processor 52 can identify nodes having non-empty sets of local pointers as representing logical volumes having private physical partitions. Processor 52 can obtain additional information regarding the private physical partitions from the tree structure, such as the number of private physical partitions a given volume. This information may also assist the processor is selecting candidate volumes for deletion.

When processor 52 deleted a certain volume permanently (e.g., for releasing disk space using the method of FIG. 2 above), the processor may delete the node representing the permanently-deleted volume. This deletion leaves parent of the deleted node with only one lower-level node. Thus, processor 52 merges the local pointers of the remaining lower-level node with the local pointers of its parent meta-volume node. This process is demonstrated on the right hand side of FIG. 3.

The right hand side of FIG. 3 shows a process of permanently deleting volume V3 from the tree structure, in accordance with an embodiment of the present invention. In the present example, processor 52 deletes V3 permanently by performing the following steps:

Delete node 60C that represents V3 from the tree structure. This deletion leaves meta-volume node 68B (MV2) with only one son (node 60B representing V2).

Merge node 60B with meta-volume node 68B, to produce a new leaf node 76. Node 76 now represents volume V2.

Combine the local pointers of the two merged nodes (i.e., combine local pointers 64B of node 60B with local pointers 72B of node 68B) to produce local pointers 80 of the new node 76 that represents V2. (In some embodiments, the combining operation may be relatively slow, e.g., on the order of several seconds. In these embodiments, combining may be performed as a background task, since it does not create new free storage space.)

Traverse the tree upwards towards the root, and update the volume count of each parent node. (Typically, a volume count is maintained by a given parent node to identify situations in which a shared partition is no longer referenced by any of the node's children and can therefore be deleted.)

In some embodiments, processor 52 maintains a table or other data structure, which indicates for each logical volume or snapshot whether it is provisionally-deleted or not. The following table demonstrates a possible implementation of such a table:

| Logical volume/snapshot | Recycled (provisionally deleted) |
|---|---|
| V1 | TRUE |
| V2 | FALSE |
| V3 | FALSE |
| . . . | . . . |

In this example, volume V1 is provisionally deleted and is typically not visible to the user. Volumes V2 and V3 are not provisionally deleted (i.e., they are valid and visible to the user). If, for example, a user provisionally deleted logical volume V2 as some stage, processor 52 changes the status of this volume in the table from FALSE to TRUE. Alternatively, processor 52 may use any other suitable implementation or data structure for this purpose.

The embodiments described herein refer to releasing physical partitions in response to a request to allocate partitions to a logical volume. The methods and systems described herein can be used, however, for freeing physical storage space for any other purpose and/or in response to any other trigger or event.

Although the embodiments described above mainly address releasing disk space for allocation to logical volumes, the methods and systems described herein can also be used in other applications, such as in managing snapshots of files in file-systems that support thin provisioning of large files.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
representing logical volumes by respective sets of pointers to physical partitions in long-term storage devices in which data used by the logical volumes is stored;
defining one or more of the logical volumes as provisionally deleted;
selecting, based on a predetermined criterion, a provisionally-deleted logical volume for deletion, wherein:
the selected provisionally-deleted logical volume comprises one or more private physical partitions,
a private physical partition is a physical partition on a long-term storage device including data that is used exclusively by the provisionally-deleted logical volume, and
the predetermined criterion comprises an age of the selected provisionally-deleted logical volume, a number of private physical partitions associated with the selected provisionally-deleted logical volume, and a size of a private physical partition associated with the selected provisionally-deleted logical volume;
deleting the selected provisionally-deleted logical volume; and
releasing at least one of the one or more of the private physical partitions for reallocation to another logical volume subsequent to deleting the selected provisionally-deleted logical volume.

2. The method according to claim 1, wherein the selected provisionally-deleted logical volume comprises a copy of a given logical volume.

3. The method according to claim 1, wherein deleting the selected provisionally-deleted logical volume comprises permanently deleting the selected provisionally-deleted logical volume.

4. The method according to claim 3, wherein representing the logical volumes comprises defining a reference-count list indicating respective counts of the logical volumes that point to the physical partitions, and wherein permanently deleting the selected provisionally-deleted logical volume comprises updating the reference-count list.

5. The method according to claim 1, wherein representing the logical volumes comprises representing the logical volumes by a hierarchical tree structure comprising nodes, wherein each of the nodes comprises a respective set of local pointers, and wherein the logical volumes are represented by respective nodes such that the local pointers in the nodes located along a path via the tree structure that connects a given node to a root node of the tree structure point to the physical partitions in which the data used by the logical volume represented by the given node is stored.

6. The method according to claim 5, wherein the local pointers in each node point to the private physical partitions of that node, and wherein selecting comprises identifying the nodes having non-empty sets of the local pointers as representing logical volumes comprising the private partitions.

7. The method according to claim 5, wherein deleting the selected provisionally-deleted logical volume comprises permanently deleting the selected provisionally-deleted logical volume by deleting the nodes representing the selected provisionally-deleted logical volume from the tree structure.

8. The method according to claim 7, wherein the tree structure comprises a binary tree in which the logical volumes are represented by leaf nodes and in which nodes that connect the leaf nodes to the root node comprise artificial nodes, and wherein deleting a first leaf node, which represents a first logical volume and is located below an artificial node, comprises:
  deleting from the tree structure a second leaf node that represents a second logical volume and is located below the artificial node;
  converting the artificial node into a merged node representing the second logical volume; and
  combining the local pointers of the second leaf node with the local pointers of the artificial node to produce the local pointers of the merged node.

9. The method according to claim 1, and comprising accepting a request to allocate the at least one of the one or more physical partition to the other logical volume and allocating the at least one of the one or more private physical partitions responsively to the request.

10. The method according to claim 9, wherein the request comprises an instruction to create the other logical volume.

11. The method according to claim 9, wherein the request comprises an instruction to resize the other logical volume.

12. The method according to claim 9, wherein the data used by the other logical volume is stored on a first storage device, and wherein the request comprises an instruction to allocate the at least one of the one or more physical partitions to the other logical volume on a second storage device upon detection of a failure in the first storage device.

13. Apparatus for data storage, comprising:
  an interface, which is operative to communicate with at least one host computer so as to receive data for storage that is addressed to logical volumes assigned on a storage device having physical partitions; and
  a processor, which is coupled to represent the logical volumes by respective sets of pointers to the physical partitions in long-term storage devices in which data used by the logical volumes is stored, is configured to:
    define one or more of the logical volumes as provisionally deleted,
    select, based on a predetermined criterion, a provisionally-deleted logical volume for deletion, wherein:
      the selected provisionally-deleted logical volume comprises one or more private physical partitions,
      a private physical partition is a physical partition in a long-term storage device including data that is used exclusively by the selected provisionally-deleted logical volume, and
      the predetermined criterion comprises an age of the selected provisionally-deleted logical volume, a number of private physical partitions associated with the selected provisionally-deleted logical volume, and a size of a private physical partition associated with the selected provisionally-deleted logical volume, and
    delete the selected provisionally-deleted logical volume, and
    release at least one of the one or more of the private physical partitions for reallocation to another logical volume subsequent to deleting the selected provisionally-deleted logical volume.

14. The apparatus according to claim 13, wherein the selected provisionally-deleted logical volume comprises a copy of a given logical volume.

15. The apparatus according to claim 13, wherein the processor is configured to permanently delete the selected provisionally-deleted logical volume.

16. The apparatus according to claim 13, wherein the processor is configured to represent the logical volumes by a hierarchical tree structure comprising nodes, wherein each of the nodes comprises a respective set of local pointers, and wherein the logical volumes are represented by respective nodes such that the local pointers in the nodes located along a path via the tree structure that connects a given node to a root node of the tree structure point to the physical partitions in which the data used by the logical volume represented by the given node is stored.

17. The apparatus according to claim 16, wherein the local pointers in each node point to the private physical partitions of that node, and wherein the processor is configured to identify the nodes having non-empty sets of the local pointers as representing logical volumes comprising the private partitions.

18. The apparatus according to claim 16, wherein the processor is configured to permanently delete the selected provisionally-deleted logical volume by deleting the nodes representing the selected provisionally-deleted logical volume from the tree structure.

19. The apparatus according to claim 18, wherein the tree structure comprises a binary tree in which the logical volumes are represented by leaf nodes and in which nodes that connect the leaf nodes to the root node comprise artificial nodes, and wherein the processor is coupled to delete a first leaf node, which represents a first logical volume and is located below an artificial node, by:
  deleting from the tree structure a second leaf node that represents a second logical volume and is located below the artificial node;
  converting the artificial node into a merged node representing the second logical volume; and
  combining the local pointers of the second leaf node with the local pointers of the artificial node to produce the local pointers of the merged node.

20. A system for data storage, comprising:
  a long-term storage device comprising physical partitions; and
  a storage controller, which is coupled to communicate with at least one host computer so as to receive data for storage that is addressed to logical volumes assigned on the storage device, configured to:
    represent the logical volumes by respective sets of pointers to the physical partitions in which data used by the logical volumes is stored,
    define one or more of the logical volumes as provisionally deleted,
    select, based on a predetermined criterion, a provisionally-deleted logical volume for deletion, wherein:

the selected provisionally-deleted logical volume comprises one or more private physical partitions, a private physical partition is a physical partition in the long-term storage device including data that is used exclusively by the selected provisionally-deleted logical volume, and the predetermined criterion comprises at least one-elan age of the selected provisionally-deleted logical volume, a number of private physical partitions associated with the selected provisionally-deleted logical volume, and a size of a private physical partition associated with the selected provisionally-deleted logical volume, delete the selected provisionally-deleted logical volume, and release at least one of the one or more of the private physical partitions for reallocation to another logical volume subsequent to deleting the selected provisionally-deleted logical volume.

21. The system according to claim 20, wherein deleting the selected provisionally-deleted logical volume comprises permanently deleting the selected provisionally-deleted logical volume.

22. The system according to claim 21, wherein representing the logical volumes comprises defining a reference-count list indicating respective counts of the logical volumes that point to the physical partitions, and wherein permanently deleting the selected provisionally-deleted logical volume comprises updating the reference-count list.

23. A computer software product for data storage, the product comprising non-transitory computer-readable storage medium, in which program instructions are stored, which instructions, when read by the computer, cause the computer to communicate with at least one host computer so as to receive data for storage that is addressed to logical volumes assigned on a long-term storage device having physical partitions, to:

represent the logical volumes by respective sets of pointers to the physical partitions in which data used by the logical volumes is stored, define one or more of the logical volumes as provisionally deleted, select, based on a predetermined criterion, a provisionally-deleted logical volume for deletion, wherein:

the selected provisionally-deleted logical volume comprises one or more private physical partitions, a private physical partition is a physical partition in the long-term storage device including data that is used exclusively by the selected provisionally-deleted logical volume, and the predetermined criterion comprises age of the selected provisionally-deleted logical volume, a number of private physical partitions associated with the selected provisionally-deleted logical volume, and a size of a private physical partition associated with the selected provisionally-deleted logical volume, delete the selected provisionally-deleted logical volume, and release at least one of the one or more of the private physical partitions for reallocation to another logical volume subsequent to deleting the selected provisionally-deleted logical volume.

24. The computer software product according to claim 23, wherein deleting the selected provisionally-deleted logical volume comprises permanently deleting the selected provisionally-deleted logical volume.

25. The computer software product according to claim 24, wherein representing the logical volumes comprises defining a reference-count list indicating respective counts of the logical volumes that point to the physical partitions, and wherein permanently deleting the selected provisionally-deleted logical volume comprises updating the reference-count list.

* * * * *